United States Patent [19]

Heckler et al.

[11] Patent Number: 5,108,279

[45] Date of Patent: Apr. 28, 1992

[54] STICK CONFECTION EXTRACTION APPARATUS

[75] Inventors: Christopher L. Heckler; Gordon A. Copas, both of Rockford, Ill.

[73] Assignee: APV Rosista, Inc., Rockford, Ill.

[21] Appl. No.: 667,344

[22] Filed: Mar. 11, 1991

[51] Int. Cl.$^5$ ............................................. A23G 9/26
[52] U.S. Cl. ................................. 425/126.2; 53/247; 198/379; 198/456; 425/DIG. 219
[58] Field of Search ................. 425/126.2, 126.1; 99/DIG. 219, 460; 53/247, 251; 198/379, 456, 450; 426/512

[56] References Cited

U.S. PATENT DOCUMENTS

| | | | |
|---|---|---|---|
| 3,031,978 | 5/1962 | Rasmusson | 425/125 |
| 4,004,400 | 1/1977 | Anderson et al. | 53/202 X |
| 4,209,288 | 6/1980 | Tumey et al. | 425/DIG. 219 |
| 4,352,830 | 10/1982 | Billett et al. | 425/126.2 X |
| 4,370,844 | 2/1983 | Kaj Degn et al. | 53/202 X |
| 4,392,803 | 7/1983 | Cross et al. | 425/126.2 |
| 4,576,562 | 3/1986 | Anderson | 62/345 X |
| 4,901,502 | 2/1990 | Colamussi | 53/247 X |

Primary Examiner—Richard L. Chiesa
Attorney, Agent, or Firm—Vernon J. Pillote

[57] ABSTRACT

An apparatus for extracting stick confections from a row of mold cups of a stick confection molding machine and for transferring the extracted confections to a multi-lane wrapping machine having a number of lanes that is a submultiple of the number of mold cups in a row. The transfer apparatus includes a plurality of transfer bar assemblies which are moved from an extraction location above and parallel to a row of mold cups to a discharge location above and transverse to the lanes of the multi-lane wrapping machine. Each transfer bar assembly includes a number of gripper heads mounted on the transfer bar assembly for turning movement about individual turning axes transverse to the transfer bar and spaced apart therealong and a number of individual gripper units mounted on each head. Mechanism is provided for turning the gripper head to an extracting position in which the gripper units on each head are spaced apart in a direction parallel to the transfer bar assembly and with the gripper units arranged in a single extraction row, and a discharge position in which the gripper units on each head are spaced apart in a direction transverse to the associated transfer bar assembly with the gripper units arranged in multiple discharge rows parallel to the associated transfer bar, and with the number of gripper units in each row being a sub-multiple of the number of mold cups in a row.

9 Claims, 6 Drawing Sheets

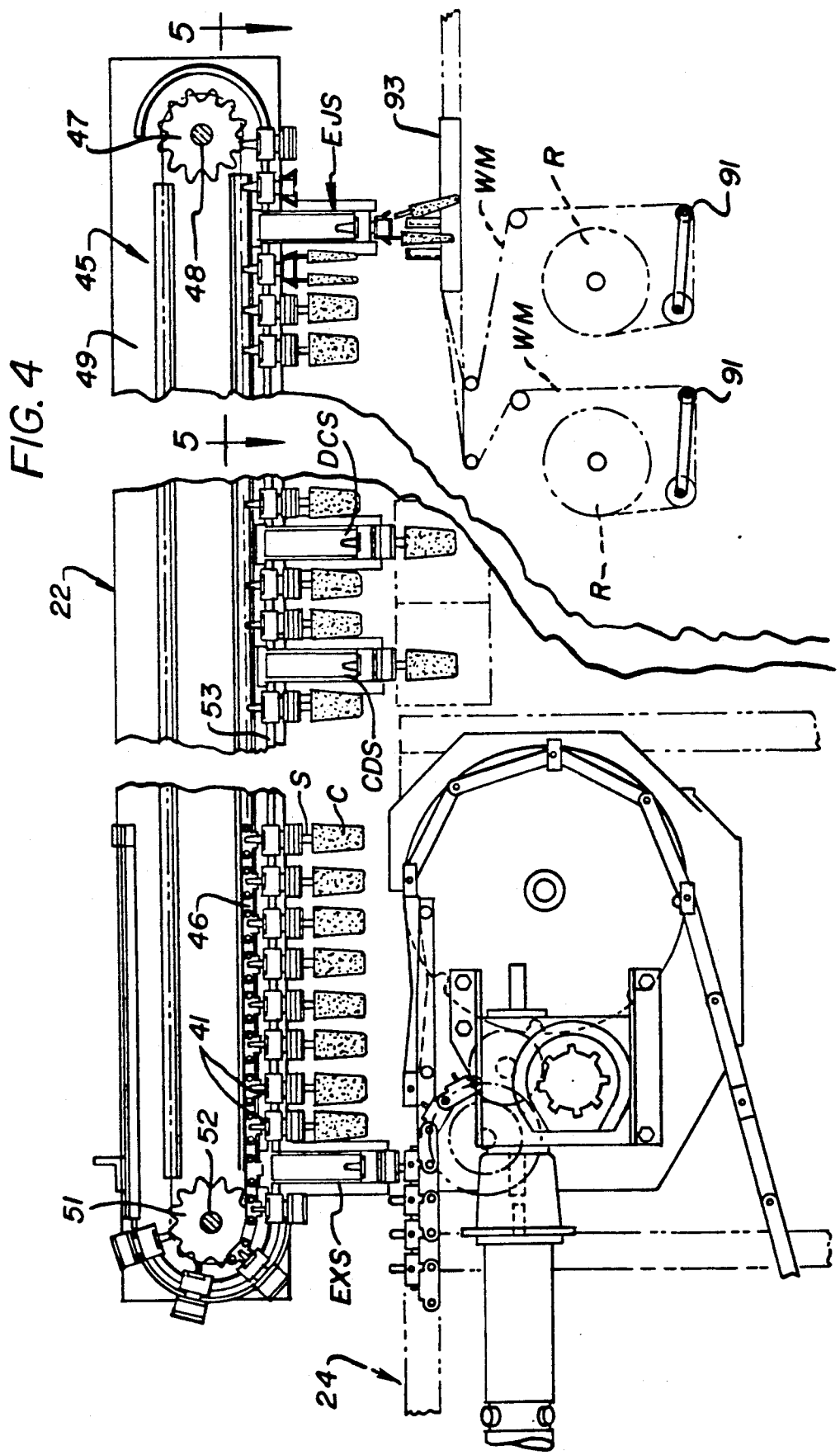

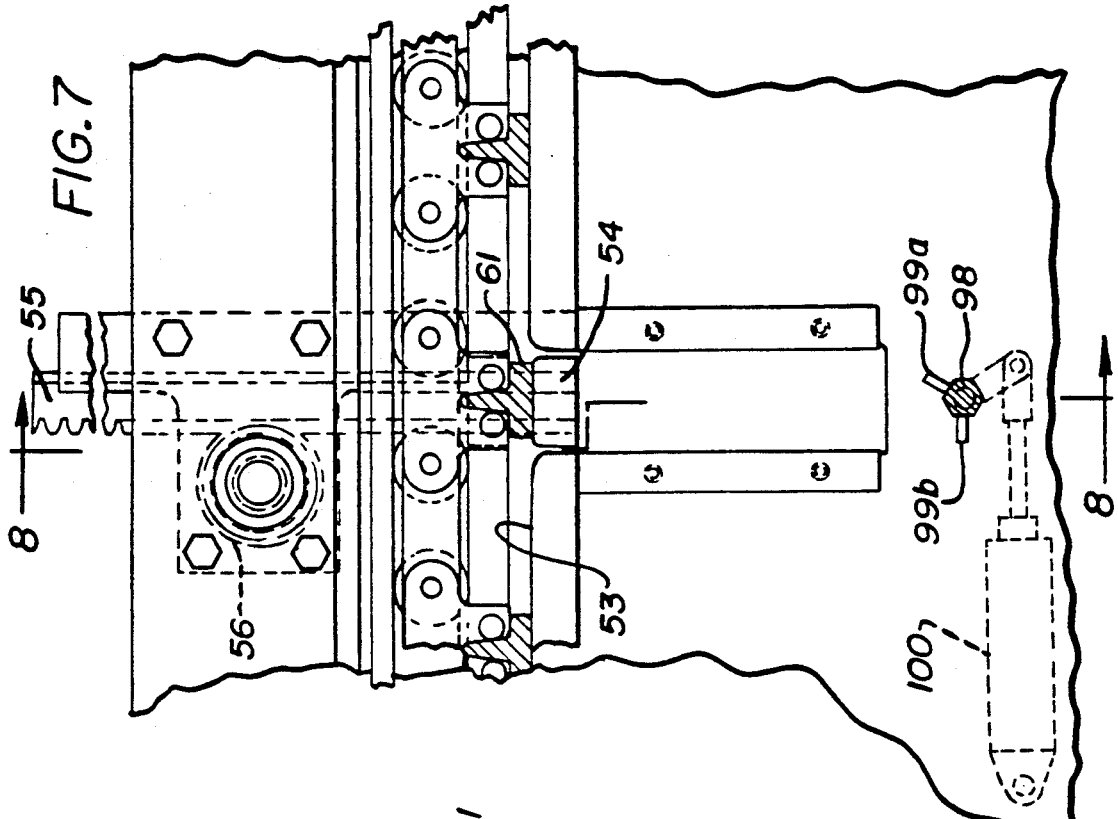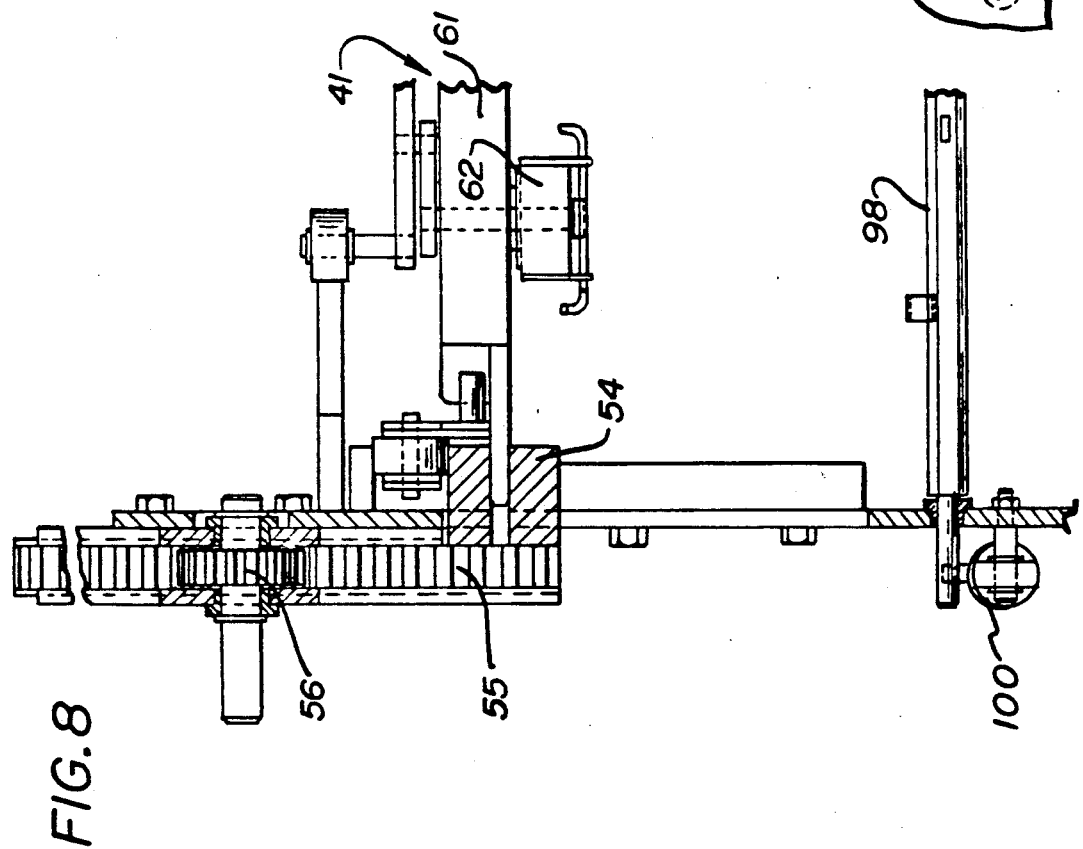

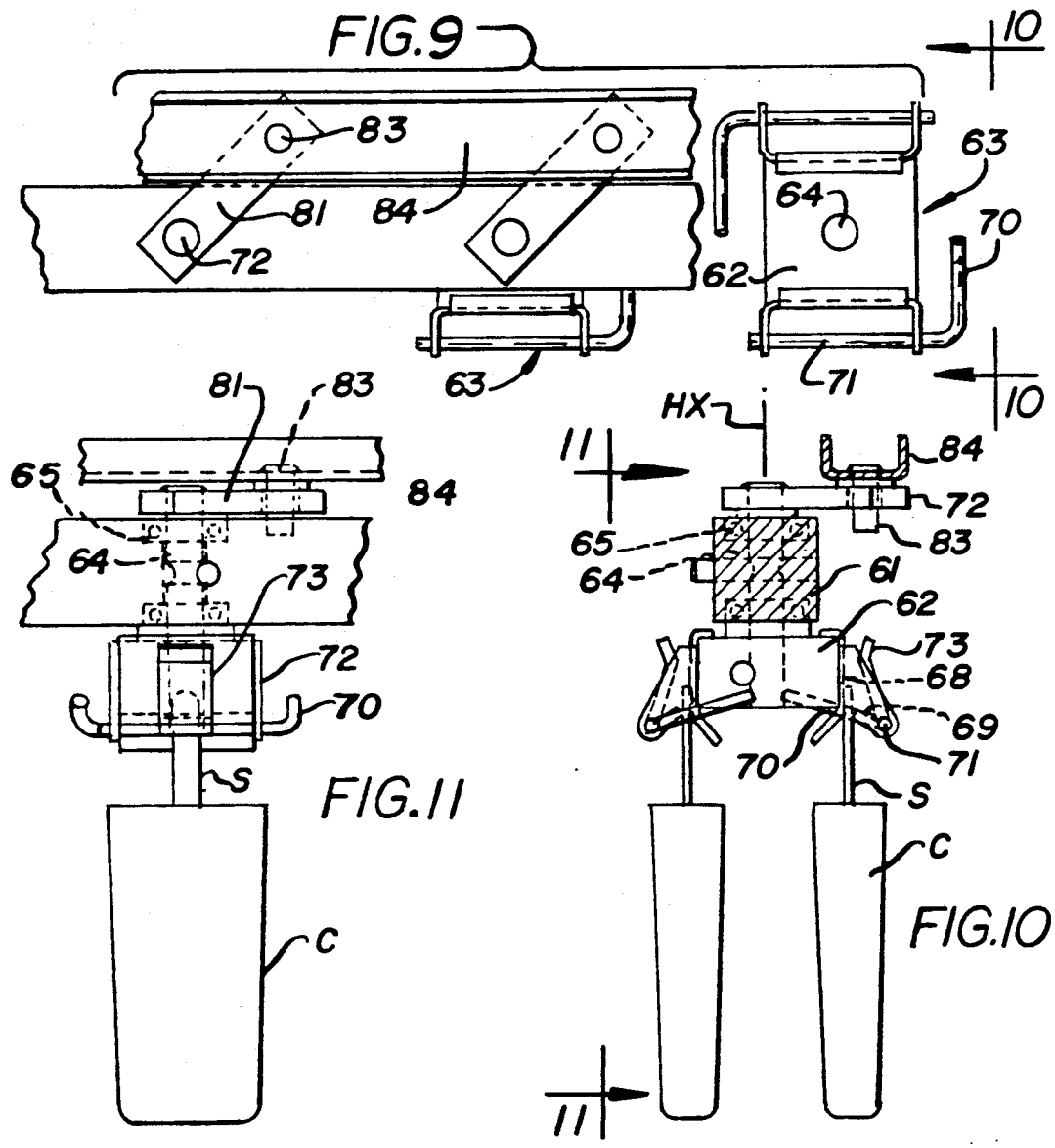
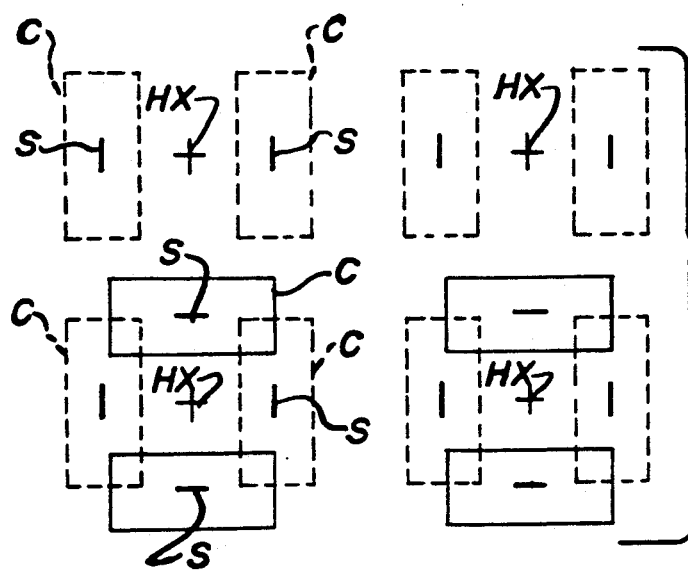

STICK CONFECTION EXTRACTION APPARATUS

BACKGROUND OF THE INVENTION

Various confection molding machines have heretofore been made for producing frozen stick confections. Such molding machines generally utilized a plurality of mold members each having a plurality of mold cups arranged in a row and which are advanced in a direction transverse to the rows past a filling station and a stick inserting station to an extraction station. The mold cups are refrigerated to freeze the confection in the cups, and then heated prior to the extraction station to facilitate extracting the stick confections.

In some prior stick confection molding machines such as disclosed in U.S. Pat. No. 4,576,562, the mold cups are arranged with the major cross-sectional dimension perpendicular to the direction of advance of the mold cups through the machine and the extractor apparatus for such molding machines have been arranged to extract and transfer the rows of stick confections in that orientation to a packaging or wrapping apparatus.

Some other prior stick confection molding machines have been made where the major cross-sectional dimension of the mold cups extends parallel to the direction of travel through the molding machine and, in such molding machines, the sticks extending from the confections in the mold cups are relatively close to each other. U.S. Pat. No. 4,392,803 discloses a stick confection extraction apparatus for use on stick confection molding machines where the major cross-sectional dimension of the mold cups extend crosswise of the row. In that patent, the extractor bar assemblies each include a plurality of gripper units that are initially arranged at intervals and orientations along the length of the extractor bar assembly to permit the gripper units to grasp the sticks of a row of frozen confections in the mold cups of the freezing apparatus, and the gripper units are arranged on each extractor bar to be rotated through a selected angle and also separated from each other to greater intervals therebetween to change the orientation of the stick confections and increase the spacing between the stick confections when they are discharged at the discharge station. In this extraction apparatus, all the stick confections from a row of mold cups are discharged in a row at the discharge station and the multi-lane wrapping machine must accordingly have a number of lanes corresponding to the number of mold cups in a row.

U.S. Pat. No. 4,370,844 discloses a packaging apparatus for packaging successive rows of objects in a wrapping machine having a number of lines corresponding to only half the number of objects in each row. As disclosed in this patent, a feeding conveyor has a plurality of gripping means arranged in a single row for holding and conveying objects in a row extending transversely of the conveying direction. Every second gripping means in the row is released at a first depositing station and the row of gripping means is then shifted lengthwise of the row and the remaining gripping means in the row released at a second depositing station so that each line of the wrapper machine receives from each row of gripping means, a pair of objects that were adjacent each other in the row when approaching the first station.

SUMMARY OF THE INVENTION

It is an object of the present invention to provide an apparatus for extracting stick confections from a row of mold cups of a stick confection forming machine and for rearranging the stick confections extracted from each row of mold cups into a plurality of parallel rows each containing a sub-multiple of the number of stick confections extracted from the mold cup and for discharging the stick confections while they are arranged in the multiple rows.

Another object of this invention is to provide an apparatus for extracting and transferring stick confections from stick confection molding machines of the type in which the mold cups have a major crosswise dimension oriented transverse to the length of the row, and which rearranges the stick confections into multiple rows each containing a sub-multiple of the number of stick confections extracted from the row of mold cups, and which also changes the angular orientation of the stick confections so that the major crosswise dimension of the stick confections extends crosswise of the lanes of a wrapping machine.

Accordingly, the present invention provides an apparatus for extracting stick confections from a row of mold cups of a stick confection molding apparatus and for transferring the extracted confections to a multi-lane wrapping machine. The extracting and transferring apparatus includes a plurality of transfer bar assemblies and means for sequentially moving the transfer bar assemblies from an extraction location above and parallel to the row of mold cups in the molding machine to a discharge location above and transverse to the lanes of the wrapping machine. Each transfer bar assembly includes a transfer bar means and a number of gripper heads mounted on the transfer bar means for turning movement about individual turning axes transverse to the transfer bar means and spaced apart therealong and a number of individual gripper units mounted on each head. Means are provided for turning the gripper heads relative to the associated transfer bar between an extracting position in which the gripper units on each head are spaced apart in a direction parallel to the transfer bar and with the gripper units on the associated transfer bar assembly arranged in a single row, and a discharge position in which the gripper units on each head are spaced apart in a direction transverse to the associated transverse bar means with the gripper units arranged in a plurality of rows parallel to the associated transfer bar and with the number of gripper units in each row being a sub-multiple of the number of mold cups in each row of the stick confection molding machine. The gripper heads on each transfer bar means are turned to the extracting position when the transfer bar assembly is at the extracting location and the transfer bar assembly is operated at the extracting location to extract stick confections from a row of mold cups while the gripper heads are in the extracting position. The gripper heads are turned to the discharge position when the transfer bar assembly is moved to the discharge location and the extractor bar assembly is operated at the discharge location to discharge stick confections while the gripper heads are in the discharge position.

The gripper units are advantageously fixed to the associated gripper heads so that, when the gripper heads are turned through approximately ninety degrees from the extraction position to the discharge position, the angular orientation of the stick confection relative to the transfer bar assembly also changes through substantially ninety degrees. Thus, the extractor bar assemblies can be used to extract stick confections from a row of mold cups in which the mold cups in a major crosswise dimension transverse to the row and to discharge the stick confections with a major crosswise dimension extending parallel to the transfer bar assemblies and transverse to the lanes of the wrapping machine.

BRIEF DESCRIPTION OF THE DRAWINGS

FIG. 4 is a fragmentary longitudinal sectional view through the stick extracting and transfer apparatus;

FIG. 7 is a fragmentary longitudinal sectional view at the discharge station;

FIG. 8 is a fragmentary transverse sectional view at discharge station taken on the plane 8—8 of FIG. 7; the FIG. 9 is a fragmentary top view of the transfer bar assembly with parts broken away to illustrate the details of construction;

FIG. 10 is a fragmentary transverse sectional view taken on the plane 10—10 of FIG. 9;

FIG. 11 is a fragmentary sectional view taken on the plane 11—11 of FIG. 10; and FIG. 12 is a schematic diagram illustrating the change in orientation of the stick confections when the gripper heads are moved from an extraction position to a discharge position.

DETAILED DESCRIPTION OF THE PREFERRED EMBODIMENT

Figure 2:
FIG. 2 is a fragmentary plan view taken on the plane such as 2—2 of FIG. 1 illustrating the orientation of the mold cups on the mold bars of the stick confection machine.
Figure 3:
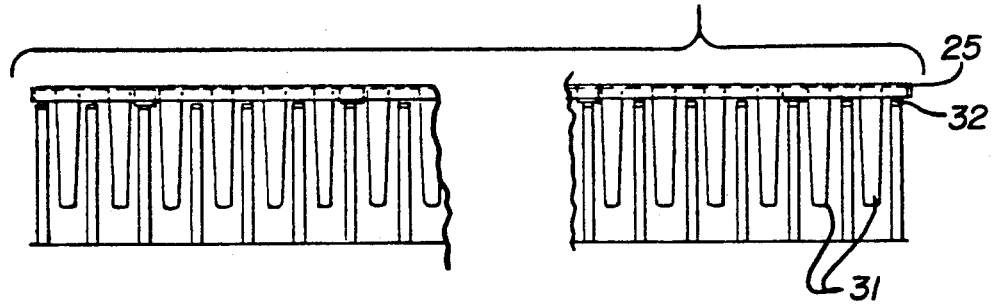
FIG. 3 is a fragmentary vertical sectional view taken on the plane 3—3 of FIG. 1.
Figure 1:
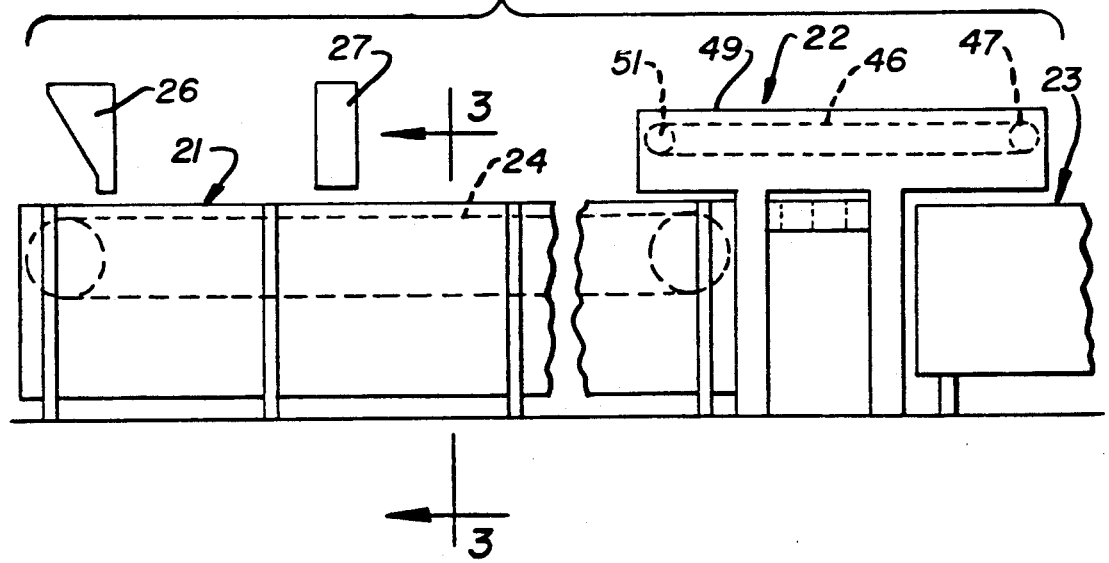
FIG. 1 is a diagrammatic side elevational view of a system for producing frozen confections that includes the stick confection extracting and transfer apparatus of the present invention.

FIG. 1 is a diagrammatic elevational view of a stick confection molding machine designated generally by the numeral 21 and having a stick confection extracting and transfer apparatus 22 for extracting stick confections from the outlet end of the stick confection molding machine and for transferring stick confections to a multilane wrapping machine designated generally by the numeral 23. The stick confection molding machine is adapted to produce frozen confections C of the type that include a block or bar of frozen confection material having a stick S projecting therefrom. As is conventional, the stick confection molding machine comprises a plurality of elongated mold bars or strips 25 and a transfer mechanism for advancing the mold bars through the stick confection forming machine sequentially past a filling apparatus 26 and a stick inserting apparatus 27 to an extraction station EXS at the outlet end of the molding machine. The stick confection molding machine may, for example, be of the type disclosed in U.S. Pat. No. 4,576,562, the disclosure of which is incorporated herein by reference. As best shown in FIGS. 2 and 3, the mold bars 25 each have a plurality of mold cups 31 spaced apart in a row along the mold bar. The transfer mechanism 24 advances the mold bars in step fashion and in the direction indicated by the arrow in FIG. 2 and the mold cups in each mold bar are filled as they dwell at the filling station 26 and sticks are inserted into the semi-frozen confection in the mold cups as the mold bars dwell at the stick inserting station 27. The mold cups are refrigerated as they are advanced from the filler to a location slightly in advance of the extraction station for example by nozzles 32 (FIG. 3) arranged to discharge a refrigerated medium such as cooled brine against the outer sides of the mold cup. The mold cups advantageously have a major crosswise dimension extending transverse to the mold bar as shown in FIGS. 2 and 3 such that the major crosswise dimension parallels the path of travel of the mold bars through the machine as indicated by the arrow in FIG. 2. The nozzles 32 are advantageously arranged to discharge low velocity streams of brine laterally against the wide outer faces of the mold cups adjacent the upper ends of the cup as they are advanced past the nozzles.

Figure 6:
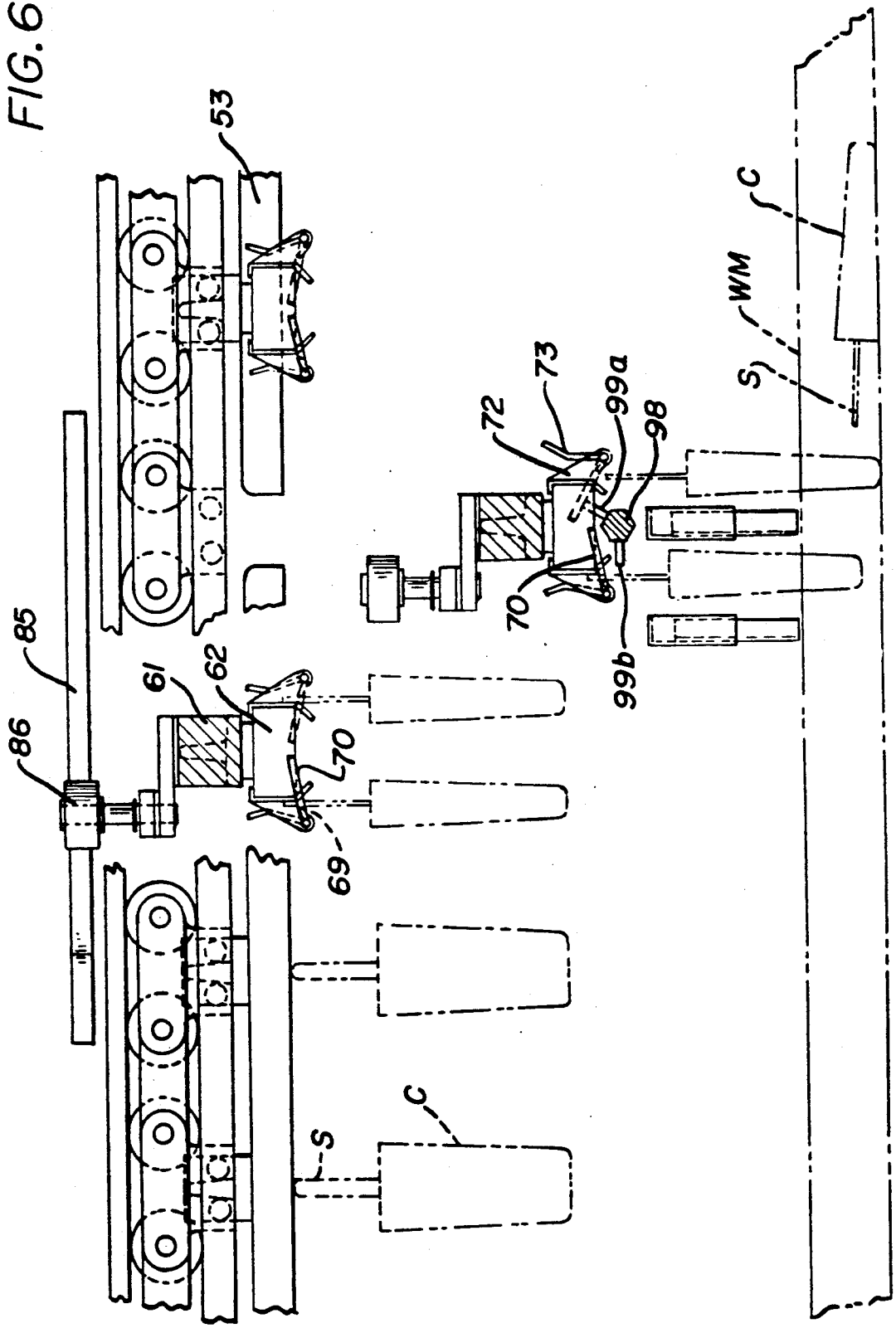
FIG. 6 is a fragmentary longitudinal sectional view at the discharge station, illustrating parts on a larger scale than FIG. 4.

The stick confection extracting and transfer apparatus 22 includes a plurality of transfer bar assemblies 41 and a means for advancing the extractor bar assemblies from an extraction location EXS at the outlet end of the stick confection molding machine, to a discharge station EJS. The transfer bar assemblies are preferably advanced in step fashion by a transfer conveyor 45. The transfer conveyor 45 is preferably generally similar to the chain conveyor of the extractor shown and described in U.S. Pat. No. 3,031,978 to M. B. Rasmusson, the disclosure of which is incorporated herein by reference. In general, conveyor 45 includes a pair of spaced chains 46 that are entrained about a pair of drive sprockets 47 mounted on a shaft 48 supported on a frame 49. Chains 46 are also entrained over sprockets 51 mounted on shaft 52 supported in the frame 49 and a drive means (not shown) is provided for driving shaft 48 in step fashion in a manner to cause the chain to move through the horizontal lower run from the extraction station EXS above the outlet end of the molding machine 21 to the ejection station EJS above the multi-lane wrapping apparatus 23. The ends of the extractor bar assemblies 45 are guided through the lower run by parallel guide tracks or channels 53 (FIG. 4, 6 and 7), the upstream ends of which are adapted to receive each extractor bar assembly as they are indexed forwardly from the extracting station. The guide tracks are broken away at a chocolate dip station CDS and a dry coat station DCS and at the ejection station EJS.

At the extraction, chocolate dip, dry coat, and ejection stations, those extractor bar assemblies which are centered at such stations, are simultaneously lowered and raised by similar reciprocating means best illustrated in FIGS. 7 and 8. Each reciprocating means includes transversely opposed blocks 54 for receiving opposite projecting ends of the extractor bar assembly (FIG. 8) The blocks 54 project inwardly from opposed racks 55 that are mounted for vertical reciprocation at opposite sides of the frame 49. The racks 55 are reciprocated as by pinions 56 and any suitable means (not shown) are provided for rotating the pinions at the several stations in unison, to first lower the extractor bar assembly at that station and then raise the extractor bar assembly back to its initial position.

The extractor and transfer apparatus of the present invention is arranged to simultaneously extract all of the stick confections from a row of mold cups in the molding machine and to transfer and rearrange the stick confections into multiple rows each containing a submultiple of the number of mold cups in a row, and to discharge the stick confection into a multi-lane wrapping machine having a number of lanes that is a submultiple of the number of mold cups in a row. The extraction and transfer apparatus is also arranged to change the angular orientation of the stick confections relative to the transfer bar means such that stick confections extracted from mold cups having a major crosswise direction that is transverse to the row of mold cups, and to orient the stick confections so that the major crosswise dimension of the stick confections parallels the rows when the stick confections are released at the ejection station. More particularly, each transfer bar assembly includes an elongated transfer bar means 61, a number of gripper heads 62 mounted on the transfer bar means for turning movement relative thereto about individual turning axes transverse to the transfer bar means and spaced apart therealong and a number of individual gripper units mounted on each head for turning movement therewith about the associated turning axis. In the preferred embodiment illustrated, the number of gripper units on each head is two and the number of heads is accordingly one-half the number of mold cups in the row on the mold bars. It is contemplated that more than two gripper units could be mounted on each head, for example three or four, and that in such an apparatus the number of heads would be respectively one-third and one quarter of the number of mold cups in a row. As best shown in FIGS. 9-11, a spindle 64 is fixed to each gripper head 62 and is rotatably supported as by bearings 65 for rotation in the transfer bar about an axis HX that is perpendicular to the transfer bar.

As best shown in FIGS. 9-11, each gripper unit 63 includes a fixed gripper jaw 68 fixed to a respective side of the gripper head 62 and a movable jaw 69 that is yieldably biased toward the fixed jaw in a manner to receive and grip the stick of a stick confection when the transfer bar assembly is lowered at the extracting station, and which is selectively removable to a stick release position. In the gripper units illustrated, the movable jaw 69 is fixed to a rod 71 that is pivotally supported on a pair of laterally spaced ears 72 on the gripper head. The movable jaw is yieldably biased as by a spring (not shown) toward a stick engaging position and a stop finger 73 is fixed to the movable jaw to limit movement of the movable jaw to a position in which it is disposed in upwardly converging relation to the fixed jaw. In the preferred embodiment illustrated, two gripper units are mounted on each head at relatively opposite sides thereof and such that the pair of gripper units on each head is arranged to receive the sticks on stick confections in two adjacent mold cups of the stick confection molding machine.

Figure 5:
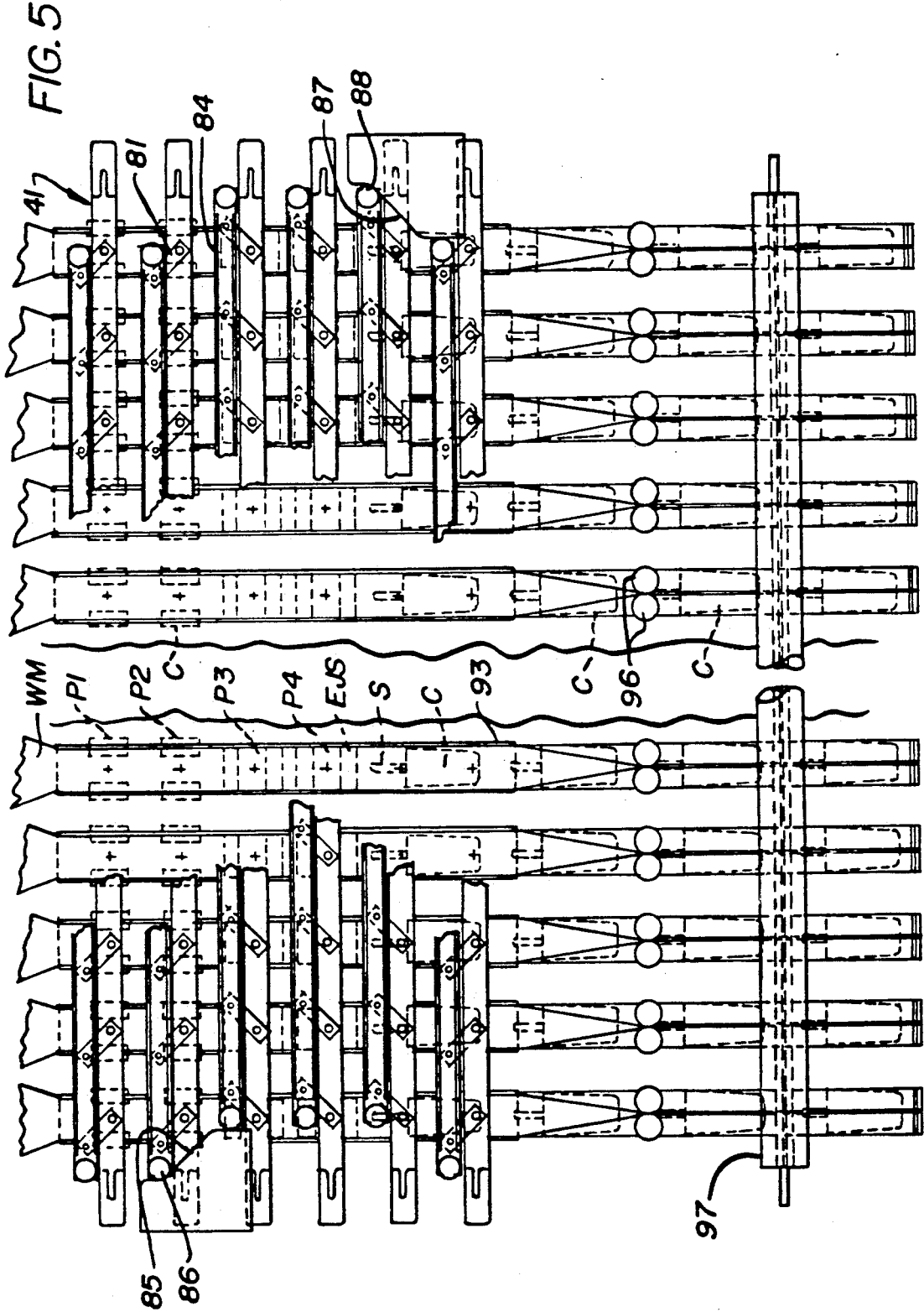
FIG. 5 is a fragmentary horizontal sectional view taken on the plane 5—5 of FIG. 4.

The turning axes HX of the gripper heads are disposed generally vertically when the transfer bar assemblies move along the lower run of the chains 46 from the extraction station to the discharge station and provision is made for simultaneously turning all of the gripper heads on each transfer bar between an extracting position in which the gripper unit on each head are spaced apart in a direction parallel to the associated transfer bar and with the gripper units on the transfer bar arranged in a single extraction row, and a discharge position in which the gripper units on each head are spaced apart in a direction transverse to the associated transfer bar with the gripper units arranged in multiple rows parallel to the associated transfer bar and with a sub-multiple of the gripper units in each row. As best shown in FIGS. 5 and 9-11, levers 81 are fixed to the upper ends of each of the spindles 72 and the distal ends of the levers on each transfer bar are pivotally connected at 83 to an actuator bar 84 disposed parallel to the associated transfer bar 61. As shown in FIG. 5, a means such as a stationary cam 85 fixed to the frame 49, is arranged to engage a cam follower 86 on one end of the actuator bars 84, to turn the gripper heads from the extracting position to the discharge position, and a second cam 87 is provided at the other side of the frame 49 and arranged to engage a cam follower 88 on the other ends of the actuator bars 84, to move the heads from a discharge position back to an extracting position. Cam 85 is located to engage the cam followers 86 after the transfer bar assemblies have moved away from the extracting station ES, and preferably after the transfer bar assemblies have moved past the chocolate dip station CDS and dry coat station DCS, but before the transfer bar assemblies reach the ejection station EJS. Cam 87 is located to engage the followers 88 on the transfer bar assemblies, after the transfer bar assemblies pass the ejection station EJS, to return the heads to their extracting position. Thus, when the gripper heads 62 are in their extracting position, the gripper units 72 on each transfer bar assembly are disposed in a single row and spaced apart a distance corresponding to the spacing of the stick confections when they are in the mold cups of the molding machine. In the embodiment illustrated in which two gripper units are mounted on each head, the number of gripper heads is made one-half the number of mold cups in a row and the spacing of the head pivot axes HX along the transfer bar assembly is made twice the center-to-center spacing of the mold cups as shown at transfer conveyor positions designated P1 and P2 in FIG. 5. When the heads are rotated through substantially ninety degrees from their extracting position to their discharge position as shown at transfer conveyor position designated P3 and P4 in FIG. 5, the stick confections are rearranged into two discharge rows parallel to the associated transfer bar and with each discharge row having one-half the number of stick confections from a row of mold cups. The stick confections in the multiple discharge rows are spaced farther apart and the angular orientation of the stick confections is also changed so that the major transverse dimension of the stick confection is disposed parallel to the transfer bar assembly in the discharge rows. Thus, in the discharge position of the heads, the stick confections are in the proper orientation for discharge at the discharge station EJS into a multi-lane wrapping machine having a number of lanes that is a sub-multiple, for example one-half the number of mold cups in a row.

The multi-lane wrapping machine 23 can be of conventional construction and may, for example, be of an intermittent motion type such as disclosed in U.S. Pat. No. 4,004,400 or a continuous motion type as disclosed in U.S. Pat. No. 4,370,844. In general, and as diagrammatically shown in FIGS. 4 and 5, a number of strips of wrapping material WM equal to the number of lanes of the wrapping machine, are unwound from supply rolls R and passed over stock tension control rollers 91 and idler rollers to a strip forming guide means 93 which forms the flat strips of wrapping material into a channel shape configuration as the strips move past the ejecting station EJS. After the stick confections are deposited on the strips, at the ejecting station the side edges of the strips are brought together and sealed as by longitudinal sealing means 96, and the longitudinally sealed strips are thereafter transversely sealed and severed intermediate adjacent stick confections as by a transverse heat sealing and severing means 97.

The stick confections supported on the gripping units on each head at the ejecting station are spaced apart in a direction transverse to the transfer bars a distance substantially less than the length of the stick confections. Provision is accordingly made for discharging one of the discharge rows at a time at the discharge station EJS onto the lines of wrapping material, such that the stick confections are spaced apart along the lines of the wrapping material as shown in FIG. 5. As previously described, the transfer bar assemblies are preferably lowered at the ejection station EJS to reduce the distance between the stick confections and the lines of wrapping material prior to release. As best shown in FIGS. 6 and 9-11, a gripper release finger 70 is formed rigid with the pivot rod 71 of the movable gripper jaw, and the gripper release fingers on the two gripper units on each head are arranged so they extend toward each other. An actuator bar 98 is mounted for rotation on the side frames 49, at a location to extend between the gripper units on each head when the transfer bar assembly is moved to its lower discharge position. One set of actuator lugs 99a are provided on the bar 98 at spaced locations therealong to engage the gripper fingers 70 of the gripper units disposed in one discharge row, when the transfer bar assemblies are moved downwardly to the lower position. A second set of lugs 99b are provided on the actuator bar 98 at spaced locations therealong and angularly spaced from the lugs 99a, and a means such as a cylinder 100 (FIGS. 7 and 8) is provided for rotating the actuator bar 98 from the position shown in FIGS. 6-8, clockwise through an angle option proximately thirty degrees, to engage the actuator fingers 70 on the gripper units in the second discharge row and release the stick confections from the second row. Means (not shown) are provided for operating the actuator 100 from its first to its second position in timed relation with the advance of the wrapping material by the multilane wrapping machine and such that gripper units in the second discharge row are released subsequent to release of the first row and after the wrapping material has advanced the stick confections from the first row a distance somewhat greater than the length of the stick confection. The transfer bar is thereafter moved back to its raised position and advanced with the transfer conveyor, until the next succeeding transfer bar assembly reaches the discharge station EJS. As will be readily understood, the transfer conveyor 45 is intermittently advanced a distance corresponding to the spacing of the transfer bar assemblies therealong and the conveyor 45 is then allowed to dwell for a time sufficient to move the transfer bar assembly at the ejection station to its lower position and to sequentially eject the discharge rows of stick confections onto the wrapping material and return the transfer bar assembly to its raised position.

The embodiments of the invention in which an exclusive property or privilege is claimed are defined as follows:

1. An apparatus for extracting stick confections from a row of mold cups of a stick confection molding apparatus and for transferring the extracted stick confections to a multi-lane wrapping machine, the extracting and transferring apparatus including a plurality of transfer bar assemblies and means for sequentially moving the transfer bar assemblies from an extraction location above and parallel to a row of mold cups of the molding apparatus to a discharge location above and transverse to the lanes of the multi-lane wrapping machine, each transfer bar assembly including (a) elongated transfer bar means, (b) a number X of gripper heads mounted on the transfer bar means for turning movement relative thereto about individual turning axes transverse to the transfer bar means and spaced apart therealong, and (c) a number Y of individual gripper units mounted on each head for turning movement therewith about the associated turning axis, where Y is an integer from 2 to 4, the turning axes being generally upright when the transfer bar assemblies are at the extracting and discharge locations, means for turning gripper heads relative to the associated transfer bar means between (i) an extracting position in which the gripper units on each head are spaced apart in a direction parallel to the transfer bar means with the gripper units on the associated transfer bar assembly arranged in a single extraction row and (ii) a discharge position in which the gripper units on each head are spaced apart in a direction transverse to the associated transfer bar means with the gripper units arranged in Y discharge rows parallel to the associated transfer bar means and X gripper units in each row, means for turning the gripper heads on each transfer bar means to said extracting position when the transfer bar assembly is moved to the extracting location, means at the extracting location for operating the transfer bar assemblies to extract stick confections from a row of mold cups while the gripper heads are in the extracting position, means for turning the gripper heads to said discharge position when the transfer bar assembly is moved to the discharge location, and means at the discharge location for operating each transfer bar assembly to discharge stick confections therefrom while the gripper heads are in the discharge position.

2. An apparatus for stick confections according to claim 1 wherein the means for discharging stick confections includes means operative to discharge stick confections from one of the discharge rows of gripper units at a time.

3. An apparatus for extracting stick confections according to claim 1 wherein the mold cups have a major crosswise dimension transverse to the row of mold cups, said gripper heads, when turned from the extraction position to the discharge position, turning the gripper units thereon through substantially ninety degrees.

4. An apparatus according to claim 1 wherein the gripper units have a first angular orientation relative to the associated transfer bar means when the gripper heads are in the extraction position and a second angular orientation displaced substantially ninety degrees from the first angular orientation when the gripper heads are in the discharge position.

5. An apparatus for extracting stick confections from a row of mold cups of a stick confection molding apparatus and for transferring the extracted stick confections to a multi-lane wrapping machine, the extracting and transferring apparatus including a plurality of transfer bar assemblies and means for sequentially moving the transfer bar assemblies from an extraction location above and parallel to a row of mold cups of the molding apparatus to a discharge location above and transverse to the lanes of the multi-lane wrapping machine, the transfer bar assemblies each including (a) elongated transfer bar means, (b) a number X of gripper heads mounted on the transfer bar means for turning movement relative thereto about individual turning axes transverse to the transfer bar means and spaced apart therealong, and (c) a number Y of individual gripper units mounted on each head for turning movement therewith about the associated turning axis, where Y is an integer from 2 to 4, the turning axes being generally upright when the transfer bar assemblies are at the extracting and discharge locations, the gripper units each being constructed and arranged to releasably grip and suspend a stick confection with the stick generally parallel to the turning axis, means for turning gripper heads relative to the associated transfer bar means between (i) a first angular position in which the gripper units on each head are spaced apart in a direction parallel to the transfer bar means with the gripper units on the associated transfer bar assembly arranged in a single extraction row containing X times Y gripper units and (ii) a second angular position substantially ninety degrees from the first angular position and in which the gripper units on each head are spaced apart in a direction transverse to the associated transfer bar means with the gripper units arranged in Y discharge rows parallel to the associated transfer bar means containing X gripper units in each row, means for turning the gripper heads to the first angular position when the associated transfer bar means is moved to the extracting location, means at the extracting location for operating the transfer bar assemblies to extract stick confections from a row of mold cups while the gripper heads are in the first angular position, means for turning the gripper heads to said second angular position when the transfer bar assembly is moved to the discharge location, and means at the discharge station for operating the transfer bar assembly to discharge stick confections while the gripper heads are in the second angular position.

6. An apparatus for extracting stick confections according to claim 5 wherein the means for discharging stick confections includes means operative to discharge stick confections from one of the discharge rows of gripper units at a time.

7. An apparatus for extracting stick confections according to claim 5 wherein the mold cups have a major crosswise dimension transverse to the row of mold cups, said gripper heads, when turned from the extraction position to the discharge position, turning gripper units thereon through substantially ninety degrees.

8. An apparatus according to claim 5 wherein the gripper units have a first angular orientation relative to the associated transfer bar assembly when the gripper heads are in the extraction position and a second angular orientation displaced substantially ninety degrees from the first angular orientation when the gripper heads are in the discharge position.

9. In a stick confection forming machine having a plurality of elongated mold bars and means for advancing the mold bars through the forming machine to an extraction location, each mold bar containing a number Z of mold cups spaced apart in a row along the mold bar, each mold cup having a major transverse dimension crosswise of the mold bar, the number X of lanes in the multi-lane wrapper being 1/Y times the number of mold cups in a row where Y is an integer from 2 to 4, an apparatus for extracting stick confections from a row of mold cups at the extraction station and for transferring the extracted stick confections to a multi-lane wrapping machine having X lanes, the extracting and transferring apparatus including a plurality of transfer bar assemblies and means for moving the transfer bar assemblies from an extraction location above and parallel to a row of mold cups of the molding apparatus to a discharge location above and transverse to the lanes of the multi-lane wrapping machine, the transfer bar assemblies each including (a) elongated transfer bar means, (b) a number X of gripper heads equal to the number of lanes in the wrapping machine mounted on the transfer bar means for turning movement relative thereto about individual turning axes transverse to the transfer bar means and spaced apart therealong, and (c) a number Y of individual gripper units mounted on each head for turning movement therewith about the associated turning axis, the turning axes being generally upright when the transfer bar assemblies are at the extracting and discharge locations, the gripper units each being constructed and arranged to releasably grip a stick and suspend a stick confection with the stick generally parallel to the turning axis, means for turning gripper heads relative to the associated transfer bar means between (i) a first angular position in which the gripper units on each head are spaced apart in a direction parallel to the transfer bar means with the gripper units on the associated transfer bar assembly arranged in a single extraction row containing Z gripper units and (ii) a second angular position in which the gripper units on each head are spaced apart in a direction transverse to the associated transfer bar means with the gripper units arranged in Y discharge rows parallel to the associated transfer bar means containing X gripper units in each row, means for turning the gripper heads to said first angular position when the transfer bar assembly is moved to the extracting location, means at the extracting location for operating the transfer bar assemblies to extract stick confections from a row of mold cups while the gripper heads are in the first angular position, means for turning the gripper heads to said second angular position when the transfer bar assembly is moved to the discharge location, and means at the discharge station for operating each transfer bar assembly to discharge stick confections from the transfer bar assemblies while the gripper heads are in the second angular position.

* * * * *